(12) United States Patent
Keithley

(10) Patent No.: US 8,941,884 B1
(45) Date of Patent: Jan. 27, 2015

(54) METHOD AND APPARATUS FOR DYNAMICALLY GENERATING A STOCHASTIC THRESHOLD TABLE

(71) Applicant: Marvell International Ltd., Hamilton (BM)

(72) Inventor: Douglas G Keithley, Boise, ID (US)

(73) Assignee: Marvell International Ltd., Hamilton (BM)

( * ) Notice: Subject to any disclaimer, the term of this patent is extended or adjusted under 35 U.S.C. 154(b) by 217 days.

(21) Appl. No.: 13/689,609

(22) Filed: Nov. 29, 2012

Related U.S. Application Data

(60) Provisional application No. 61/566,376, filed on Dec. 2, 2011.

(51) Int. Cl.
*H04N 1/405* (2006.01)
*G06K 15/02* (2006.01)

(52) U.S. Cl.
CPC .................................. *G06K 15/1881* (2013.01)
USPC ......................................... 358/3.06; 358/3.19

(58) Field of Classification Search
USPC .......................................................... 358/3.06
See application file for complete search history.

*Primary Examiner* — Barbara Reinier
*Assistant Examiner* — Christopher D Wait

(57) ABSTRACT

Various techniques for generating transformed tables by applying transformations indicated in a transformation table to a first threshold halftone table that is unsuitable for tiling an image as part of an image half-toning process are described. A block of the transformed tables represent a second threshold halftone table that is suitable for the half-toning process, wherein the second threshold halftone table is larger than the first threshold halftone table, such that the block is too large to be stored in the memory. A half-toned image of the image is generated based at least in part on the second threshold halftone table.

20 Claims, 7 Drawing Sheets

METHOD AND APPARATUS FOR DYNAMICALLY GENERATING A STOCHASTIC THRESHOLD TABLE

CROSS REFERENCE TO RELATED APPLICATIONS

The present disclosure claims priority to U.S. Patent Application No. 61/566,376, filed Dec. 2, 2011, which is incorporated herein by reference.

BACKGROUND

Digital half toning using screening techniques is an approach widely used to maintain the highest quality perceived image while utilizing a printer or display that can only achieve a limited number of output states. Such digital halftoning techniques control the printing of dots, located in pre-determined locations of a screen, to obtain the illusion of continuous tones based upon a comparison of the required shade of gray, or color tone, with one of a set of predetermined threshold levels in an associated threshold halftone table.

One type of screen that has been found to generate visually pleasing patterns is a stochastic screen. A stochastic screen produces fixed size dots with a somewhat random nature (e.g., blue-noise), using halftone patterns that are generally less visible than structured halftone patterns produced by other traditional techniques, such as ordered dither. In general, a threshold halftone table associated with the stochastic screen is tiled across an input image to generate an unstructured, visually appealing resultant half toned image suitable for reproduction using a printer.

To generate a stochastic screen, an algorithm typically requires a large threshold halftone table to reduce the visibility of repeating patterns seen when tiling the stochastic screen across an image. Since most modern printers support resolutions of 600 dots-per-inch (DPI), 1200 DPI, or higher, a large threshold halftone table, for example, 1024×1024 or larger, is often used to reduce the visibility of repeating patterns of the associated stochastic screen. To support ever increasing printer operating speeds, a threshold halftone table is generally stored in high speed memory (e.g., cache memory, tightly coupled memory, or the like) resident in the printer itself. Assuming a threshold halftone table comprises 8 bit entries, a single threshold halftone table of size 1024×1024 can require greater than 1 mega-byte (MB) of high speed printer memory.

Such solutions cause ever-increasing hardware and manufacturing costs due to the large high speed memory requirements, whereas the historical trend in the industry has been directed to declining costs accompanied by increasing performance. Therefore, it is desirable to generate a large stochastic screen using a much smaller threshold halftone table that would require much less high speed memory, to reduce hardware and manufacturing costs.

SUMMARY

In various embodiments, the present disclosure provides a method comprising accessing a transformation table and one or more threshold halftone tables that are unsuitable for an image half-toning process stored in a memory of a processor, and applying transformations indicated in the transformation table to at least a first of the one or more threshold halftone tables to generate transformed tables for tiling the image. A block of the transformed tables represent a second threshold halftone table suitable for the half-toning process, wherein the second threshold halftone table is larger than the first threshold halftone table, such that the block is too large to be stored in the memory. A half-toned image of the image is generated based at least in part on the second threshold halftone table.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
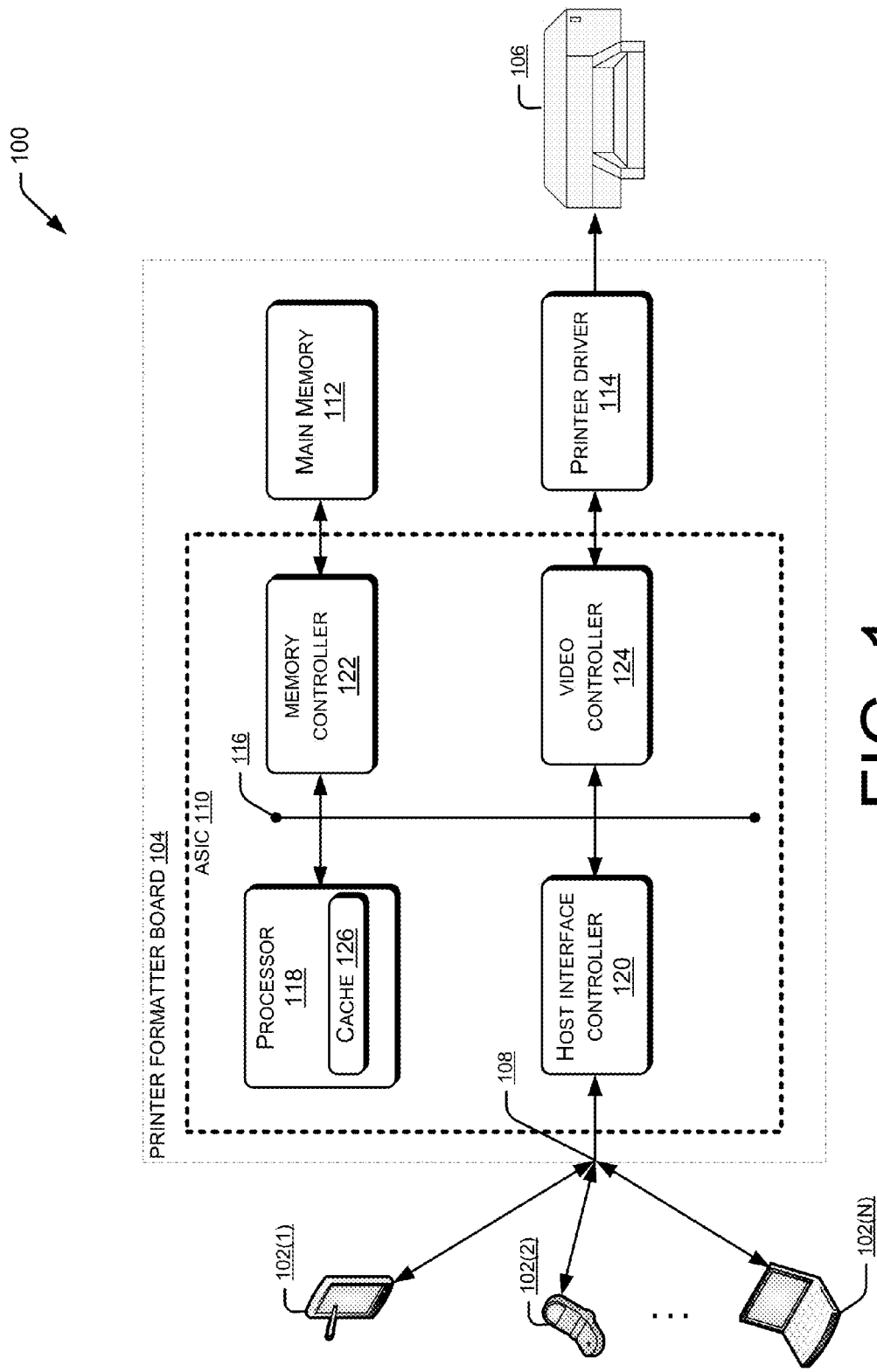
FIG. 1 schematically illustrates an example printing device.

As discussed above, the historical trend in the industry for the manufacturing of display devices, such as printers, has been directed to reducing costs accompanied by increased performance. Fast high quality half toning of images is a crucial function that must be supported by these devices. Performing a halftone process via stochastic screening has shown to provide a number of advantages over other halftoning techniques. Therefore, some way is needed to reduce the size of stochastic screen tables (e.g., threshold halftone tables), and still retain a large distance between the stochastic screen pattern that will be repeated as part of the tiling process.

The present disclosure describes image processing techniques for applying transformations to a relatively small (e.g., 64×64, 128×128) stochastic-like threshold halftone table having pre-determined table entries, as it is tiled across an image to implement a half-toning process. The threshold halftone table is referred to as "stochastic-like," because it is designed to at least approximate, if not achieve, generation of a stochastic screen. Using various transformations of the small stochastic-like threshold halftone table during the tiling process, image half toning results are achieved having a quality that is comparable to using a much larger (e.g., 1024× 1024) threshold halftone table. In an aspect, a small threshold halftone table having stochastic-like properties is constructed. However, instead of just tiling this same small threshold halftone table across the image, which would create a visually perceptible repeat pattern due to its small size, a transformed representation of the small threshold halftone table is generated for each tile placement position during the tiling process.

In an aspect, a transformation to be applied to the small threshold halftone table is selected from a plurality of transformations as a function of the small threshold halftone table, such that a current, past and/or future tile placement position of the small threshold halftone table dictates a next transformation to be applied to the small threshold halftone table. In an aspect, a large stochastic screen is generated based on applying a block of unique, or pseudo-unique, table transformations to the small threshold halftone table during tiling. Table transformations are selected in an ordered fashion (e.g., sequentially), in one or more predetermined sequences, in a random fashion, or the like. A size of the large stochastic screen is based at least in part on a number of transformation entries in a transformation table. Contrary to simply tiling just the small threshold halftone table with no transformations applied, which would create a visually perceptible repeat pattern in a half toned image, the resultant large stochastic screen generated via the application of the transformations would not create a visually perceptible repeat pattern in the half toned image.

In one aspect, after a large stochastic screen is generated during tiling, an identical sequence of transformations can then be applied to the small threshold halftone table, resulting in a repeat of the large stochastic screen used in the tiling process. In this aspect, the large stochastic screen would repeat based in part on a number of transformations in the transformation sequence. In a different aspect, a different set of transformations or different sequence of the transformations can be applied to the small threshold halftone table to generate a different large stochastic screen used in the tiling process. In yet another aspect, transformations can be applied to multiple different small threshold halftone tables in various sequences to effectively generate one or more large stochastic threshold tables used in the tiling process that would not create a visually perceptible repeat pattern in the half toned image.

As an example, table transformations are structured for one or more small halftone threshold tables to assure that the pattern for any particular row or column has a very long repeat distance, such that it would take multiple tiles before the original table information is seen to repeat. Transformations and/or transformation sequences are selected to assure that undesirable noticeable patterns, such as repeat patterns, streaks, lines or line segments, rosette patterns, moiré patterns, other distortion patterns, or the like, are not observed in half-toned images viewed by a human observer under normal viewing conditions, such as normal viewing distances and viewing angles.

The present disclosure also describes various aspects related to the construction of small stochastic-like threshold halftone tables such that various boundary conditions, and other conditions, are met at least between adjacent tiled transformations of the small threshold halftone table(s). In an aspect, the small threshold halftone tables are constructed such that, for m and n being positive integers, a 2-dimensional m×n or m×m block of tiled transformed small threshold halftone tables are structured to not produce unwanted noticeable patterns that are related to the tiling or the half toning process. In another aspect, the small threshold halftone tables are constructed such that the m×n or m×m block of tiled transformed tables can effectively generate a large stochastic-like screen that at least approximates a blue noise type mask that produces unstructured, visually appealing halftone patterns in half-toned images. In another aspect, the m×n or m×m block of tiled transformed tables provides a half toning quality that is at least comparable to a single stochastic mask or screen of a size similar to that of the block. As an example, an m×m block of tiled transformed tables produces half tone results at least comparable to a conventional stochastic screen of size 1024×1024.

The half toning process described herein can be performed by a display device. In an embodiment, the display device is a printing device, such as a printer. For simplicity, the techniques described herein will be addressed as implemented by a printer, such that the printer may execute instructions via one of its processors (e.g., hardware state machine, dedicated state machine, dedicated hardware or logic, Application-Specific Integrated Circuit (ASIC) implementation, hardware processor, hardware processor core, or the like) to facilitate the half toning process, and contain memory of the processor (e.g., ASIC Static Random Access Memory (SRAM), tightly coupled memory, processor cache memory) and system memory used to store instructions and tables. In an aspect, by utilizing one or more of the small stochastic-like threshold halftone tables, as opposed to the larger stochastic half tone tables currently used, the memory requirements of the printer are significantly reduced, thereby lowering hardware and manufacturing costs of printers.

Example Environment

FIG. 1 is a schematic diagram of an example printing system architecture 100 for receiving an image from a computing device, such as printer client devices 102(1)-102(N), image processing the image by applying digital half toning via printer formatter board 104, and printing the processed image via printing device 106.

Printer client devices 102(1)-102(N) may include numerous wired or wireless devices, such as a laptop computer, cell phone, game console, desktop computer, personal digital assistant (PDA), wearable computing device, implanted computing device, digital camera, video camera, security camera, scanner, mobile computing device, client computing device, server computing device, or any other device capable of generating or transmitting image data for printing.

The printing device 106 can be any appropriate device (e.g., a monochrome printer, a color printer, a laser printer, an inkjet printer, and/or the like) that prints images on a printing medium (e.g., paper, cloth material, synthetic medium, etc.). Printing device 106 can also in addition, or alternately, be capable of projecting an image received from printer client device 102, such that the projected image would benefit from a half toning process. Thus, printing device 106 may not be constrained to printing an image, as printing device 106 may be capable of projecting an image or video on a wall, a desk or other suitable projection surface using a visible or non-visible spectrum of light. Printing device 106 may project an image or video as a hologram. Printing device 106 may display an image or video on a display screen, such that the displaying may benefit from the half toning techniques described herein, A connection 108 may be provided between the printer client device 102 and printer device 106 over which printer client device 102 can transmit image data, for example, in the form of print jobs to printer device 106. The connection 108 may be a direct serial or parallel connection between printer client device 102 and printer device 106. Alternatively, connection 108 may interface with a local area network ("LAN"), a wide area network ("WAN") and/or a print server (not shown). Connection 108 may also be a wireless connection or any other connection over which data can be transferred from the printer client device 102 to printer device 106.

Printer client device 102 customarily runs an application that generates image data representing an image that is to be printed. The image data is passed or transmitted to a client printer driver that also customarily runs on the printer client device 102. The client printer driver configures the image data into a form appropriate for transmission to the printing device 106 via connection 108.

The image data is received by, for example, printer formatter board 104 located within the printer 106 (but shown externally in FIG. 1 for clarity of illustration). Printer formatter board 104 provides processing circuitry that formats the image from printer client device 102 for printing on printing device 106. The formatting of the image will typically include processing pixels of the image elements to optimize the image according to the particular characteristics of printing device 106. Such formatting, for example, may include half toning the image, noise or artifact removal, line enhancement, contrast enhancement, color enhancement, resolution enhancement, and so forth.

As an example configuration, printer formatter board 104 is shown to include an integrated circuit 110 for performing the processing of the image data for printing device 106. Because such integrated circuits are often customized for the particular printer characteristics, the integrated circuit 110 may include an application-specific integrated circuit (ASIC). Printer formatter board 104 may also include additional elements such as main memory 112 and internal printer driver 114.

Integrated circuit 110 generally includes internal bus 116 that connects at least one processor 118, host interface controller 120, memory controller 122, and video controller 124. Processor 118 comprises a hardware state machine, dedicated state machine, dedicated hardware or logic, dedicated Application-Specific Integrated Circuit (ASIC) configuration, hardware processor, hardware processor core, or the like. Processor 118 includes, or is tightly coupled to, one or more data caches, locked cache, SRAM (e.g., local SRAM of ASIC 110), tightly coupled memory, or the like, referred to hereafter as cache 126 and/or "memory of the processor" for purposes of simplicity. Cache 126 stores or is loaded with one or more small threshold halftone tables, and associated tables or instructions, to perform half toning of an image for printing or display by printer device 106.

Memory controller 122 connects to, and controls, main memory 112. Host interface controller 120 connects to printer client device 102 through connection 108. Video controller 124 generally provides the output from integrated circuit 110 to internal printer driver 114 for communication to, and control of, the specific printing hardware in printing device 106.

In an embodiment, ASIC 110 accesses a small threshold halftone table from cache 126, accesses a configuration table of transforms to be applied to the small threshold halftone table, performs tiling of an image using the small threshold halftone table by applying an associated transform in the configuration table of transforms to the small threshold halftone table for each tiling iteration, and provides the resultant tiles of the half toned image to printer driver 114 via video controller 124 for printing by printing device 106.

In an alternate embodiment, ASIC 110 accesses a transformation table from cache 126, selects and accesses one of the set of small threshold halftone tables from cache 126, and applies a transformation to the selected table as indicated by the transformation table for each tiling iteration. Thus, the tiling process may be extended to have a set of tables and making the table selection an additional part of the tiling process. When tiling, the selection of both the table and transform to be applied to the table may be done randomly, pseudo-randomly, via instructions or configuration table selected. In yet an alternate embodiment, such as when processing an image in a raster fashion (e.g., one row at a time), ASIC 110 accesses a row of a transformation table from cache 126, accesses a row of a selected small threshold halftone table from cache 126, and applies the row of transformation values to the row of the selected small threshold halftone table. As such, the tiling process is performed on a row by row basis to accomplish tiling iterations. Such processing in a raster fashion puts even smaller memory size requirements on cache 126, since cache 126 does not have to hold entire table(s) for normal processing of the image.

As an example, the configuration table is a 64×64 array of configuration values that would be applied to the small threshold halftone table(s) during tiling. This would enable a large distance between identical configuration and small threshold halftone tables, and the spacing does not have to be consistent within the 64×64 array. The arrangement of 64×64 tiles may repeat, so a larger repeat pattern may exist, for example, every 64 tiles (e.g., every 4 to 8 thousand pixels). This periodicity of repetition is at a low enough spatial frequency to not be noticeable in a half-toned image by a human observer.

Half-Toning Using Transformations of Small Threshold Halftone Tables

In an example implementation, the present disclosure describes a halftone process using transformations of one or more small halftone tables to process a contone image via a tiling process to produce an associated halftone image. The halftone process is a method of changing image data to ensure that the data accurately represents the image across different devices, such as printers. As an example, a halftone process includes converting contone image data (e.g., pixels) in a form suitable for display on a higher resolution monitor to halftone image data (e.g., dots) suitable for display on paper by a lower resolution printer.

A contone image generally contains a variety of luminosities from white through to a saturated hue. As such, a contone image is an image where brightness appears consistent and uninterrupted. In a discrete or digital world, contone is the appearance of smooth changes of luminance levels generated by discrete levels. Conversely, a halftone image generally contains a variety of densities that simulate continuous tone imagery, for example, through the use of a colorant deposited on media.

As an example, one method of converting contone data to halftone data uses a halftone table associated with pre-determined dot positions or matrix values, which may act as a threshold matrix, such that the halftone process includes a lookup method via the halftone table. The halftone table may be created via a stochastic process using a pseudo-random probability distribution function (e.g., blue noise distribution function) to pre-determine dot positions. It should be noted that the pseudo-random probability distribution function (e.g., blue noise distribution function) generally refers to the spectral shape of the resulting halftone image, and not the halftone threshold table itself. In an aspect, the halftone threshold table is built such that when it is thresholded at any contone image level, the resulting binary pattern approximates the statistics and power spectrum of the associated pseudo-random probability distribution. Therefore, when the halftone table is thresholded at a level g of the contone image, the resulting binary pattern p(i,j,g) is called the dot profile for that level. The value of the dot profile at a particular location (i,j) for a given level g may be given by:

$$p(i, j, g) = \begin{cases} 1 & g > m_{ij} \\ 0 & g \le m_{ij} \end{cases} \quad (1)$$

where m is the corresponding value in the halftone table.

Thus, in one aspect, the contone to halftone conversion process is implemented as a comparison of two values: contone pixel values and corresponding halftone threshold table values. Thus, the halftone threshold table is tiled (e.g., tessellated) across the contone image, or a suitably pre-processed contone image, to implement the halftone process, such that contone pixels may be compared to halftone table values to determine a distribution of dots in a corresponding tile of the halftone image.

Figure 2:
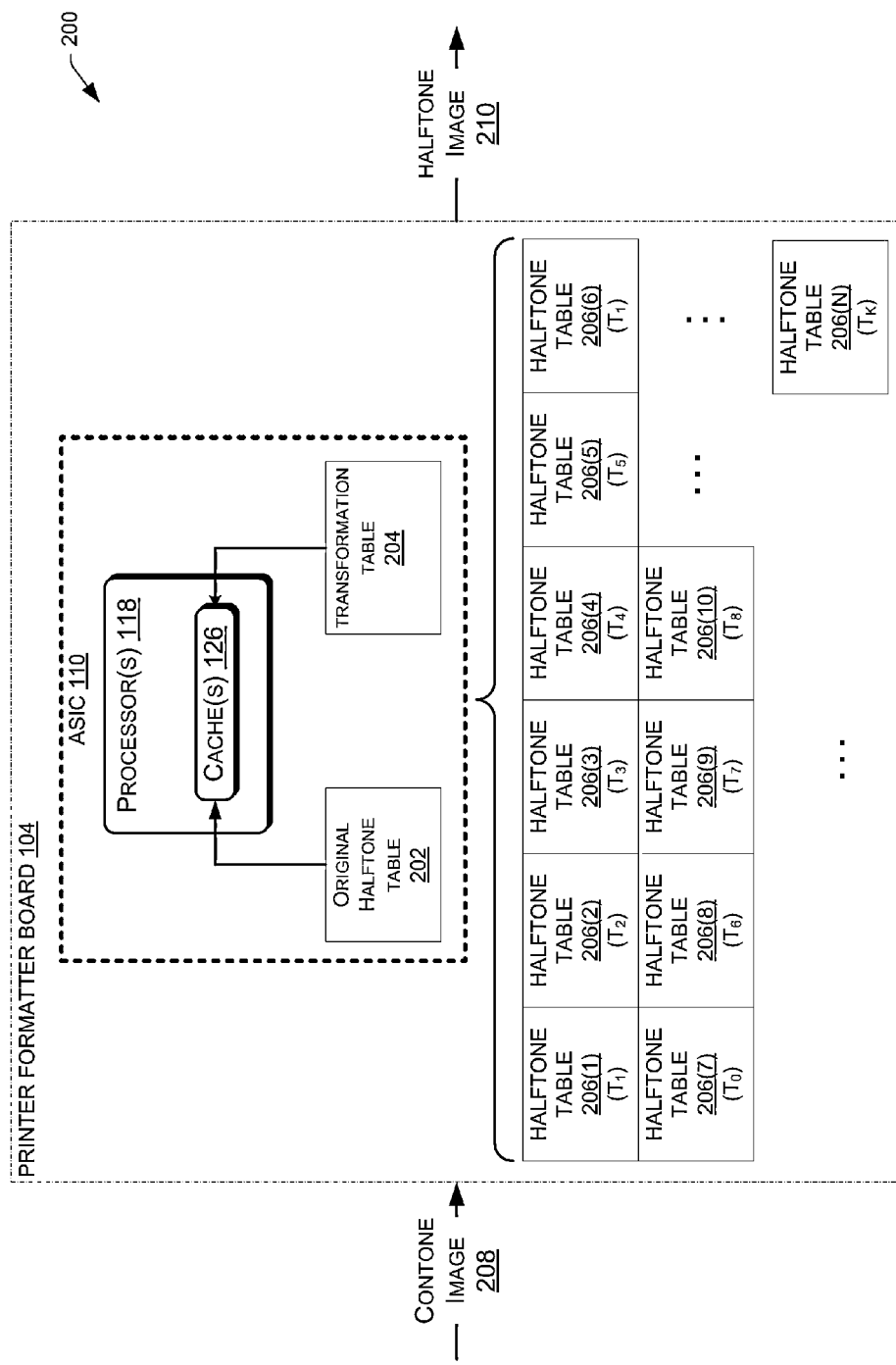
FIG. 2 is a schematic diagram showing an example halftone process.

FIG. 2 is a schematic diagram of example environment 200 for using a small stochastic-like threshold halftone table 202, along with transformation instructions or transformation table 204, for generation of halftone tables 206(1)-206(N) using transformations $T_0$-$T_K$. Halftone tables 206(1)-206(N) are tiled across contone image 208, to facilitate generation of halftone image 210. In an embodiment, processor 118 may access original halftone table 202, as well as transformation table 204, from cache 126 to generate halftone tables 206(1)-206(N). In an aspect, contone image 208 is tiled (e.g., tessellated) by halftone tables 206 in a non-overlapping and repeated way that may cover every pixel of contone image 208. Halftone tables 206 are shown as rectangles in FIG. 2. However, in an alternate embodiment, halftone tables 206 may correspond to other shapes that tessellate contone image 208.

In an embodiment, cache 126 is small in size. As an example, ASIC 104 has a cache 126 that is too small to contain conventionally sized half tone tables, such as half tone tables of size 256×256, 512×512, 1024×1024 or larger. Therefore, cache 126 may be sized approximately just large enough to support half toning using small sized halftone tables, such as halftone tables of size 64×64 or 128×128. Such small cache sizes allow for lower ASIC 110 costs as well as lower manufacturing costs for printing device 106. Thus, in an aspect, the half-toning methods using one or more small halftone tables described herein target lower cost ASICs having a small sized cache.

As an example operation, processor 118 reads a first transform parameter or instruction $T_1$ from transformation table 204 and applies the transform associated with $T_1$ to original halftone table 202 to generate halftone table 206(1). Halftone table 206(1) is then applied as a tile to, for example, a first row and first column of contone image 208. However, this is not a constraint, as other offsets are possible. Processor 118 then uses halftone table 206(1) as a look-up table, to compare pixels in the tiled portion of contone image 208 to associated threshold values in halftone table 206(1) to determine how to distribute dots in a corresponding portion of halftone image 210. Processor 118 then reads a next transform parameter $T_2$ from transformation table 204 to generate halftone table 206 (2) to tile a next portion of contone image 208 to generate a next corresponding portion (i.e., tile) of halftone image 210. In an aspect, the next portion is directly adjacent to halftone table 206(1). Processor 118 then reads subsequent values from transformation table 204 to generate halftone tables 206(3)-206(N) such that halftone tables 206(3)-206(N) are tiled (e.g., tessellated) across contone image 208 to generate halftone image 210. Halftone table 206(1) is shown as column aligned with halftone table 206(7). However, in an alternate embodiment, halftone table 206(7) may not be aligned column-wise with halftone table 206(1), but may have a horizontal offset relative to halftone table 206(1), such that contone image 208 is tiled using a brick-like tiling pattern.

As shown in FIG. 2, in an embodiment, transformations of original halftone table 202 are repeated as part of the tiling process. In an alternate embodiment, a current transformed halftone table may be transformed to create a subsequent halftone table. As an example, instead of transforming original halftone table 202 to generate halftone table 206(3), halftone table 206(2) may be transformed to generate halftone table 206(3).

As shown in FIG. 2, halftone table 206(1) and halftone table 206(6) are generated using the same transformation $T_1$. Additionally, for at least one of the tiles, no transform may be required. Such is shown in halftone table 206(7), where transformation value $T_0$ implies no transformation, such that original halftone table 202 may be used for the associated tiling position of halftone table 206(7).

In an embodiment, transformations are applied by progressively reading transformation table 204 until the end of transformation table 204 is reached. At this point, the reading process may be restarted, by reading the first to the last value in transformation table 204, such that the tiling pattern of halftone tables 206 are repeated as a function of a number of entries in transformation table 204, thus repeating the large stochastic-like mask generated by the applying the sequence of transformations. Thus, transformation table 204 is read over and over until all of contone image 208 has been tiled by respective halftone tables 206. The number of times that values need to be read from transformation table 204 depends on a number of factors, such as the size of halftone table 206 and the size of transformation table 204. Other factors include the size and resolution of contone image 208, the size and resolution of halftone image 210, the current print resolution being used for printer 106, or the like. In an alternate embodiment, transformation table 204 is read in a random fashion using a pseudo-random number generator to generate associated halftone tables 206, such that a tiling pattern of halftone tables 206 repeats as a function of the length of the pseudo-random number generator or other pseudo-random aspects of the pseudo-random number generator.

Conventional stochastic screening techniques use the same large stochastic halftone table for every tile position in the halftone process. For small halftone tables (e.g., 64×64 to 128×128), this can lead to visually discernible patterns on a printed image, especially when using higher resolution printers (e.g., 600 dots per inch (DPI), 1200 DPI, etc.). These visually discernible patterns are due to the high repeat rate of the smaller halftone tables. To resolve this issue, larger halftone tables (e.g., 1024×1024) are conventionally used. To support faster print speed, these larger tables need to be stored in high speed memory, such as cache 126. Thus, cache sizes in excess of 1-2 mega-bytes (MB) are required using conventional screening techniques.

Figure 3:
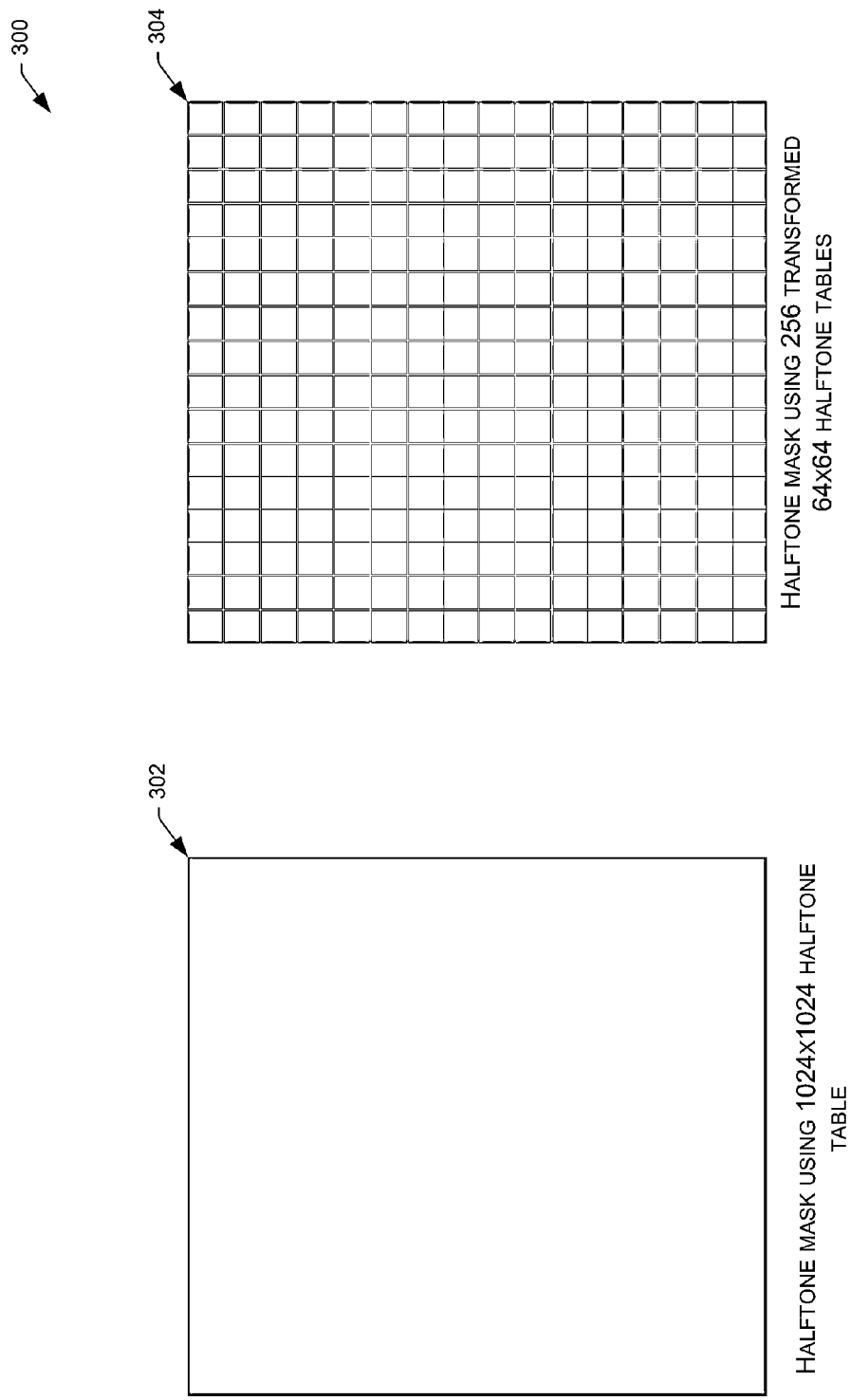
FIG. 3 is a diagram showing an example of representing a large halftone table with a block of tiled small transformed halftone tables.

However, based on appropriate scaling and/or tile placement, transformation table 204 may only require 16×16 transition entries applied to a small 64×64 halftone table to represent a much larger 1024×1024 halftone table. FIG. 3 is an example diagram 300 showing an illustrative conventional 1024×1024 halftone mask 302, and an approximation of halftone mask 302 via halftone mask 304. As an example, halftone mask 302 is a stochastic mask and halftone mask 304 is generated using 256 transformations of 64×64 original halftone table 202 to approximate a stochastic mask. Note that halftone mask 304 is shown to approximate halftone mask 302 for illustrative purposes only, as halftone mask 304 is not constrained by size, shape or dot distribution relative to halftone mask 302. Example diagram 300 is shown to merely illustrate that transformations of a small halftone table (e.g., 64×64) may be used to approximate a large halftone table (e.g., 1024×1024), such that halftone mask 304 may have a dot distribution that at least approximates the dot distribution of halftone mask 302. A difference is that a much smaller cache 126 can be used to generate halftone mask 304 relative to halftone mask 302.

As an example, assuming that each entry in the halftone table used to generate 1024×1024 halftone mask 302 is 8 bits, then a minimum size required for cache 126 to store halftone table 302 would be ~1.05 MB. Conversely, assuming 8 bit entries for each of 16×16 transformation table 204 and 64×64 original halftone table 202, a minimum size required for cache 126 would be 256B+4096B=4352B. Therefore, in this example, the cache size requirement for generating halftone mask 302 is over 240 times greater than the cache size requirement for generating halftone mask 304.

Transformation table 204 could be made smaller or larger to facilitate transformations of, for example, original halftone table 202. In an aspect, transformation table 204 contains algebraic or other functions to facilitate transformations of halftone tables. In the example above, a transformation table of size 16×16 was used. However, transformation table 204 may be even smaller if it simply contained one or more simple functions. Conversely, in one aspect, transformation table 204 may be made larger, such as 64×64, such that halftone mask 304 may effectively be much larger than halftone mask 302, while still maintaining a small size requirement for hardware memory, such as cache 126. In a different aspect, a larger transformation table 204 may generate multiple large masks, such as multiple different masks 304 for use in the tiling process.

Figure 4:
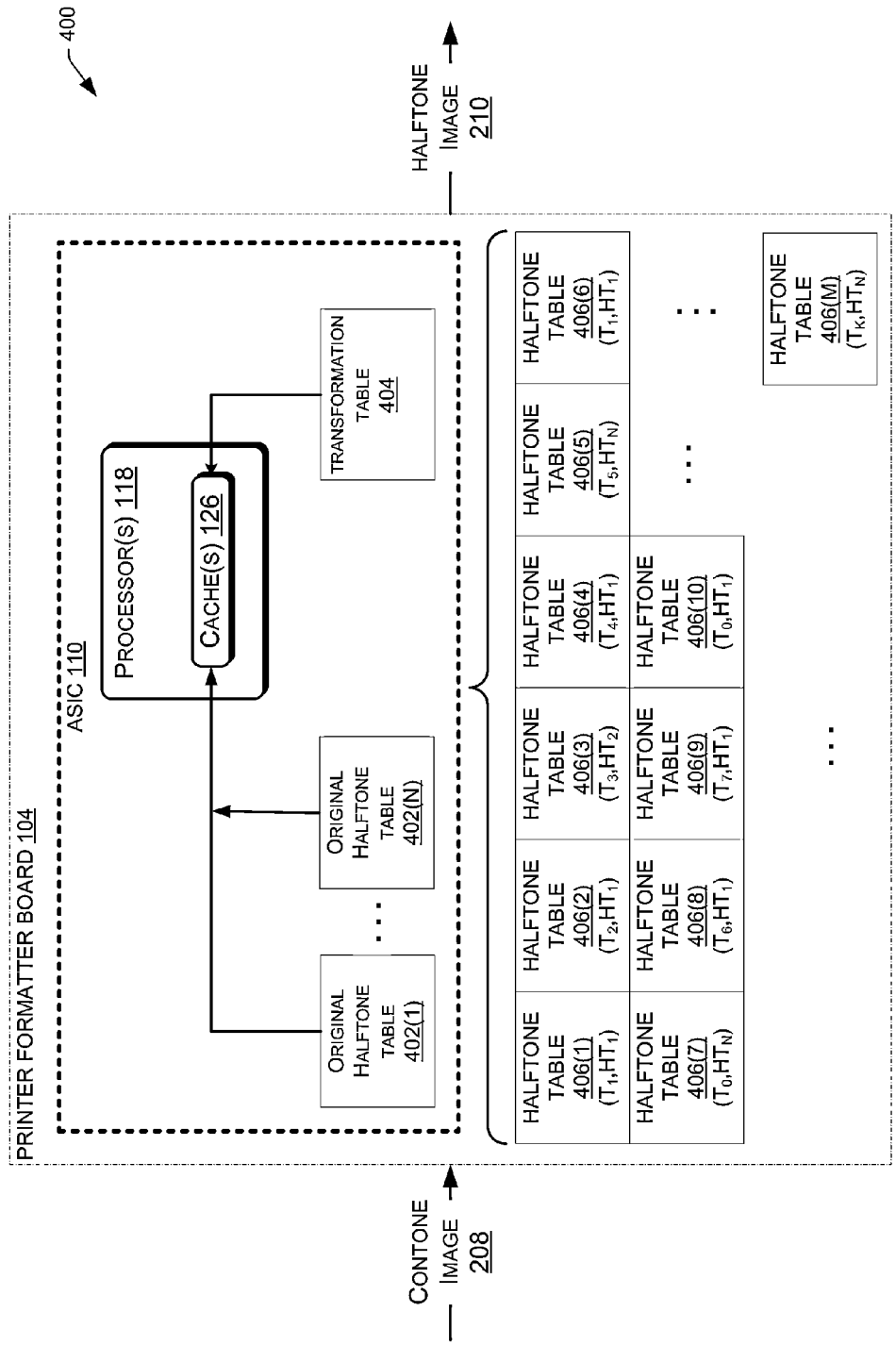
FIG. 4 is a schematic diagram showing an alternate example halftone process.

FIG. 4 is a schematic diagram of an alternate example environment 400 for using multiple small stochastic-like threshold halftone tables 402(1)-402(N) along with transformation instructions in transformation table 404, for generation of halftone tables 406(1)-406(M). In this example environment, transformation table 404 includes transformations $T_0$-$T_K$, as well as a specification $HT_1$-$HT_N$ of which original halftone table 402(1)-402(N) to transform to generate halftone tables 406(1)-406(M) for tiling contone image 208 to generate halftone image 210. Transformation table 404 is illustrated as a single table, but in other aspects, transformation table 404 may be multiple tables or data files. Similar to the discussion presented herein regarding FIG. 2, processor 118 accesses original halftone tables 402(1)-402(N) and associated transformation values as indicated in transformation table 404, from cache 126, to generate halftone tables 406(1)-406(M).

In example environment 400, halftone table 406(1) is generated using original halftone table 402(1) (i.e., as specified by $HT_1$) by applying transformation $T_1$ to original halftone table 402(1). Halftone table 406(3) is generated using original halftone table 402(2) (i.e., as specified by $HT_2$) by applying transformation $T_2$ to original halftone table 402(2). Halftone table 406(5) is generated using original halftone table 402(N) (i.e., as specified by $HT_N$) by applying transformation $T_5$ to original halftone table 402(N). Halftone table 406(7) is generated using original halftone table 402(N) (i.e., as specified by $HT_N$) by applying no transformation (i.e., transformation $T_0$) to original halftone table 402(N).

As an example, assuming original halftone tables 402 are of size 64×64, each additional halftone table may increase memory requirements by only about 4096 bytes. However, for a given number of transformation values, the number of halftone tables 406 that may be generated may increase based on the number of additional halftone tables 402. In an aspect, the number of halftone tables 406 that may be generated before repeating would be greater if three original halftone tables 402 are used, relative to just using a single halftone table 402. Thus, a size of a large halftone screen, and/or a number of large halftone screens that may be generated, may be effectively larger, resulting in an even lower repeat rate.

Characteristics of Halftone Masks and Transformations

Figure 5:
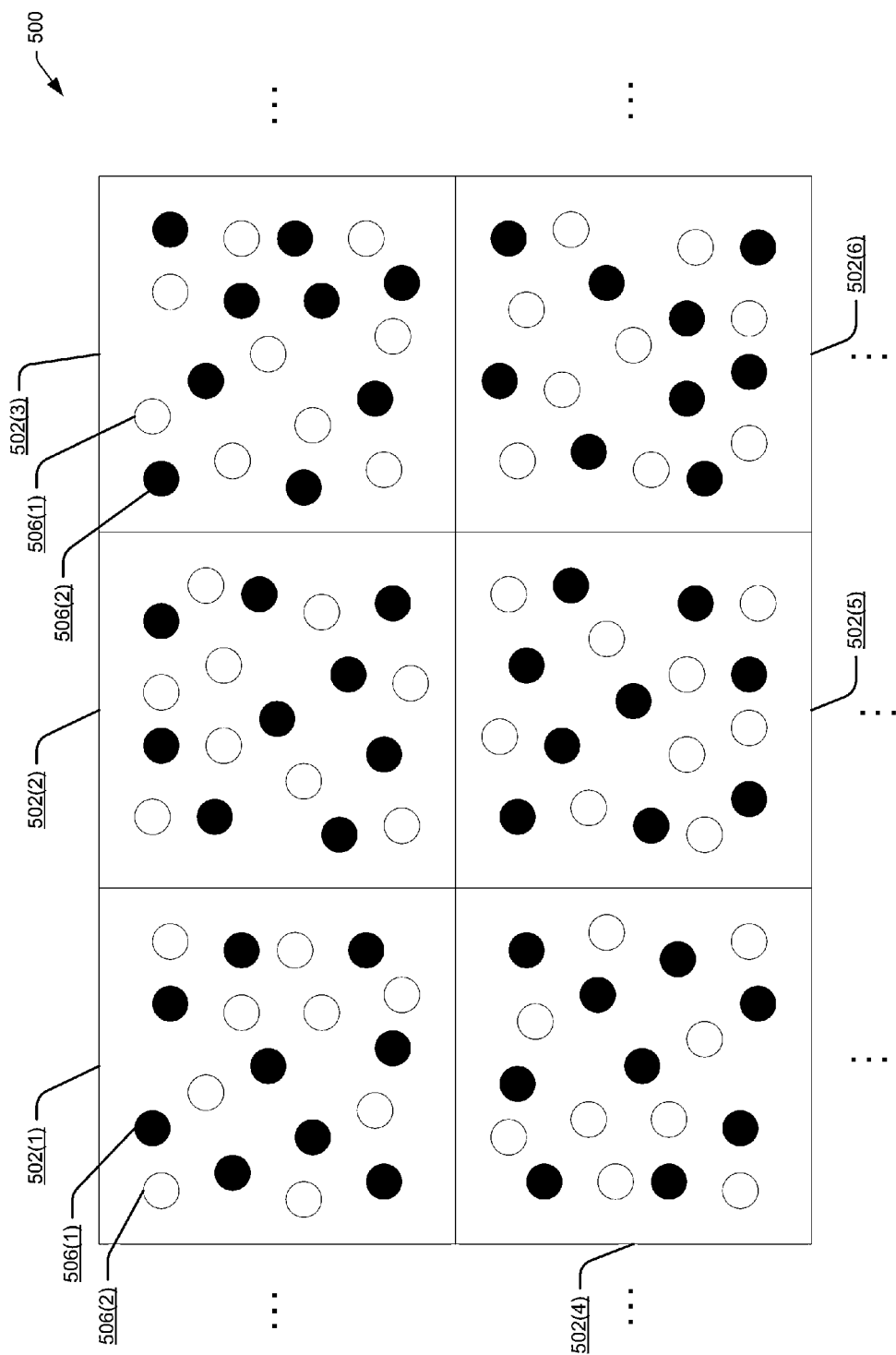
FIG. 5 is a diagram showing an example of tiling transformations of small halftone tables.

FIG. 5 is a diagram of an example environment 500 illustrating tiling positions of halftone masks 502(1)-502(6) resulting from transformations of a halftone table, such as original halftone table 202 or one of original halftone tables 402. For simplicity of discussion, halftone masks 502(1)-502(6) are illustrated at a very low dot resolution, with only six tile positions of numerous required tiling positions shown. As an example, halftone masks 502(1)-502(6) represent halftone masks generated by tiling contone image 208 over an area of constant tone or grey-scale. As an example, if halftone mask 502(1) is generated using original halftone table 202, halftone masks 502(2)-502(6) are generated as transformations of original halftone table 202, corresponding to transformed versions of halftone mask 502(1), as will be described in greater detail herein.

Halftone mask 502(1) is illustrated as a distribution of dots, such as dot 506(1). Dots are represented in halftone masks 502 by the dark filled-in circles. The dots in halftone mask 502(1) are arranged in pre-specified locations. Moreover, the dots in halftone mask 502(1) are arranged in pre-specified locations according to a pre-specified distribution of dots. Additionally, halftone mask 502(1) may also include holes, such as hole 506(2). Holes are represented in halftone masks 502 by the non-filled-in circles. The holes generally indicate specified locations in halftone mask 502(1) that do not contain a dot. Holes may also be arranged at specified locations based at least in part on a pre-specified distribution of holes. Thus, as an example, holes represent places on halftone image 210 where toner of a printer is not present.

In an embodiment, the distribution of dots are arranged to follow a stochastic-like distribution (e.g., approximated blue noise distribution) of dots. In an aspect, the holes may also be arranged to follow a stochastic-like distribution. As an example, the dots and holes in one or more of halftone masks 502 and/or each of halftone masks 502 are arranged according to one or more pre-specified distributions. As another example, the dots and holes across multiple of transformed halftone masks 502 are arranged according to one or more pre-specified distributions. For simplicity, FIG. 5 shows only six halftone masks of a plurality of halftone masks used in the tiling process. In an aspect, the dots and holes across the plurality of halftone masks are arranged according to one or more pre-specified distributions. As an example, returning to FIG. 3, dots and holes across all 256 small halftone masks are arranged according to one or more pre-specified distributions across all of region 304.

Returning to FIG. 5, in an aspect, dots are distributed based on boundary conditions to minimize noticeable boundaries between tiles, such that, for example, a human observer would not notice boundaries between transformed tiles on a printed half toned image at various normal viewing distances or viewing angles. Additionally, a large set of blocks of transformed tiles 502 together create a large stochastic-like halftone mask such that, for example, a human observer would not notice mask repetition patterns on a printed image at various normal viewing distances or viewing angles. Therefore, original halftone tables (e.g., table 202 and tables 402), as well as the associated transformations of the original halftone tables (e.g., $T_0$-$T_K$), are designed such that masks adhere to specific boundary conditions and do not cause repetition patterns or boundaries between two or more transformed masks that are noticeable to a human observer under normal viewing conditions (e.g., using the naked eye).

As an example, regarding the design of original halftone tables and their transformations, there must be no noticeable boundaries between mask 502(1) and either of masks 502(2) or 502(4), which are shown as transformations of 502(1). As an example, the distribution of dots across boundaries between masks 502(1), 502(2) and 502(4) would be distributed such that no noticeable lines, streaks, or other patterns indicative of a visible boundary would be noticed by a human observer on a printed copy of the half-toned image. In an aspect, masks and transformation sequences are designed such that the distribution of dots across all boundaries of all masks 502 may follow a stochastic-like distribution, so that no noticeable boundaries are generated in the tiling process. Likewise, there must be no noticeable boundaries between mask 502(1), and either of another mask above or adjacently left (not shown) of mask 502(1). Similarly, there must be no noticeable boundaries between, for example, mask 502(2), 502(1), 502(3) and 502(5), as well as all of masks 502 taken as a whole.

Therefore, original halftone tables, as well as transformations, are designed to achieve specific dot (and additionally hole) distributions across blocks of associated masks, such that all transformations, certain subsets of transformations and/or certain sequences of transformations meet boundary conditions to produce the desired dot distributions in halftone masks, and further without creating noticeable boundaries between masks 502 or groups of masks 502.

A variety of transformations can be used. Referring again to FIG. 5, a few sample transformations are shown. As an example, mask 502(2) is obtained by performing a 270 degree rotation of the threshold table associated with mask 502(1). Mask 502(3) is obtained by replacing the holes in mask 502(1) with dots, and replacing the dots with holes, such as via an inversion of the threshold table associated with mask 502(1). As shown, dot 506(1) in mask 502(1) is replaced with hole 506(1) in mask 502(3), and hole 506(2) in mask 502(1) is replaced with dot 506(2) in mask 502(3). Mask 502(4) is obtained by performing a 180 degree rotation of the threshold table associated with mask 502(1). Mask 502(5) is obtained by performing a 90 degree rotation of the threshold table associated with mask 502(1). Mask 502(6) is obtained by performing a 90 degree rotation of the inverted threshold table associated with mask 502(1). As such, mask 502(6) is shown as a 90 degree rotation of mask 502(3).

Transformations of halftone tables can be performed, in any sequence, or in specifically designed sequences, to create tiles of halftone masks without noticeable boundaries between masks. In viewing a small halftone table as a matrix of threshold values, some examples of transformations may include, but are not limited to, the following:

1) A halftone threshold table may be shifted (e.g., with wrapping) vertically some number of rows each time the table is to be tiled horizontally.
2) A halftone threshold table may be shifted (e.g., with wrapping) horizontally for each new row tiled.
3) A halftone threshold table may be transformed via horizontal, vertical or diagonal mirroring as well as combined horizontal, vertical and diagonal mirroring.
4) A halftone threshold table may be transformed via orthogonal rotation (e.g., 0, 90, 180 and 270 degrees).
5) A halftone threshold table may be transformed via inversion by converting dots to holes and holes to dots.
6) A halftone threshold table may be transformed via numerous algebraic functions.

Additionally, multiple halftone tables (e.g., tables 402(1)-402(N)) may be transformed making table selection an additional part of the tiling process, while still maintaining no noticeable boundaries between masks. Therefore, the transformation of tiles 502, as illustrated in FIG. 5, may be extended to using multiple halftone tables where transformations satisfy boundary conditions.

As an example of an algebraic transformation function, if an original halftone table is constructed linearly (e.g., as a uniform histogram or a histogram that is symmetric about a mid-point) with equal numbers of values selected from 0 to 254, a new table may be generated with a simple function, such as:

$$f(n)=254-n,$$

where $0<n\leq 254$. (2)

Equation (2) may be used to affectively generate a completely different array by swapping how the light and dark areas may be generated in associated masks. The value of n may be selected sequentially, pseudo-randomly and/or based on a pre-specified sequence.

Returning to FIG. 4, in various embodiments, when tiling, the selection of both the table (e.g., table 402(1)-402(N)) and transform (e.g., $T_0$-$T_N$) to be applied to the table could be either randomly (or pseudo-randomly) selected, or configuration table (e.g., transformation table 404) selected.

As an example, transformation table 404 contains a 64×64 array of configuration values that would be applied to a selected table (e.g., tables 402(1)-402(N)) as it was being tiled. This enables a larger distance between identical blocks of tables, yet the spacing between identical blocks of tables does not have to be consistent within the 64×64 array. The arrangement of 64×64 tiles (in this example) would repeat, so a larger repeat pattern may exist every 64 tiles (e.g., approximately every 4 to 8 thousand pixels). This easily provides for a low enough spatial frequency of tile repetitions so as to not be visually noticeable by a human observer.

As shown with respect to FIG. 5, to minimize noticeable boundaries between tiles, the original table(s) is designed with the knowledge of what data (e.g., dots or holes) would be at the boundaries for numerous transformations and transformation sequences. In one aspect, to simplify this problem, the configuration table limits the number of possible combinations of transformed tables that would be generated when the tables are tiled to meet boundary conditions. In another aspect, the configuration table specifies one or more specific sequences of transformed tables that are generated when the tables are tiled to meet boundary conditions. Thus, tiles 502 in FIG. 5 illustrate example transformed tiles designed to meet boundary conditions between tiles.

In a conventional halftone system that uses, for example, a single 1024×1024 threshold table, the single table is tiled over an image with a repeat pattern, for example, every 1024 pixels. In contrast, using the techniques described herein, the repeat pattern may be controlled by a number of factors, such as, the number of transformations (e.g., $T_0$-$T_K$) used, the number of small original halftone tables (e.g., tables 402(1)-402(N)) used, the number of different sequences of transformations used, the sequence of selected original halftone tables used, the number of transformation/original halftone table pairs used, the number of sequences of transformation/original halftone table pairs used, and the like. As long as the associated mask in each tile position adheres to the specific boundary conditions, as discussed herein, large repeat patterns may exist using a relatively small number of transformations and original halftone tables.

Generation of a conventional 1024×1024 or other large threshold table can be represented in a number of ways using the techniques described herein. As an example, transformation table 404 contains 16×8 transformations, such as $T_0$-$T_{127}$. Each transformation is alternated between two 64×64 original halftone tables 402(1) and 402(2), such that the associated masks are used to tile an image and adhere to the specific boundary conditions. Thus, in this example, the conventional 1024×1024 threshold table is represented using two 64×64 original halftone tables and an 8×8 transformation table, at a significant memory savings, relative to directly using the conventional 1024×1024 threshold table.

As another example, transformation table 404 contains 16×16 transformations, such as $T_0$-$T_{255}$. Each transformation is applied to a single 64×64 original halftone table 402(1), such that the associated masks are used to tile an image and adhere to the specific boundary conditions. Thus, in this example, the conventional 1024×1024 threshold table is represented at a significant memory savings, relative to directly using the conventional 1024×1024 threshold table.

As yet another example, to reduce the required number of transformations, transformation table 404 contains 8×8 transformation values, such as $T_0$-$T_{63}$. Each transformation is applied to four 64×64 original halftone tables 402(1), 402(2), 402(3) and 402(4) such that the associated masks are used to tile an image and adhere to the specific boundary conditions. Thus, in this example, the conventional 1024×1024 threshold table is represented at a significant memory savings, relative to directly using the conventional 1024×1024 threshold table.

As yet another example, to reduce the required number of transformations needed, transformation table 404 contains different sequences of transformation values, such as permutations (e.g., without repetition) of transformation values. Thus, if only a single original halftone table 402 is available for selection, transformation table 404 contains a subset of 16×16 permutations without repetition of transformation values, such that the associated masks are used to tile an image and adhere to the specific boundary conditions. If two original halftone tables 402(1) and 402(2) are available for selection, transformation table 404 contains at least a subset of 16×8 permutations without repetition of transformation values, such that the associated masks are used to tile an image and adhere to the specific boundary conditions. As such, the conventional 1024×1024 threshold table is represented at a significant memory savings, relative to directly using the conventional 1024×1024 threshold table.

These are but a few examples of generating blocks of halftone tables with low repeat rates, at significant high speed memory size savings relative to using conventional threshold table techniques. Thus, large stochastic-like threshold masks may be emulated, generated or represented for tiling based at least in part on factors such as the size of small original halftone tables, the number of viable transformations available, the number of permutations of transformation sequences, the number of original halftone tables available for selection, permutations of transformations and original halftone table sequence pairs, algebraic formulas, and the like. Transformations may be selected such that the associated masks adhere to the specific boundary conditions and the associated mask at least approximates a desired distribution statistic within masks and/or among blocks of masks.

Therefore, in an example embodiment, one or more original halftone tables of size N×N, may be transformed using a transformation table of size K×K or K×L, to produce one or more large stochastic-like halftone masks of size M×M or M×P suitable for tiling an image as part of a halftone process, where M>>N, P>>N, M>>K, P>>K, M>>L and P>>L where M, N, K, P and L are positive integers. As an example, M≥512 or M≥1024, 64≤N≤128, K≤N, L≤N, P>>N and P>M or P<M.

Example Methods of a Half-Toning Process

Figure 6:
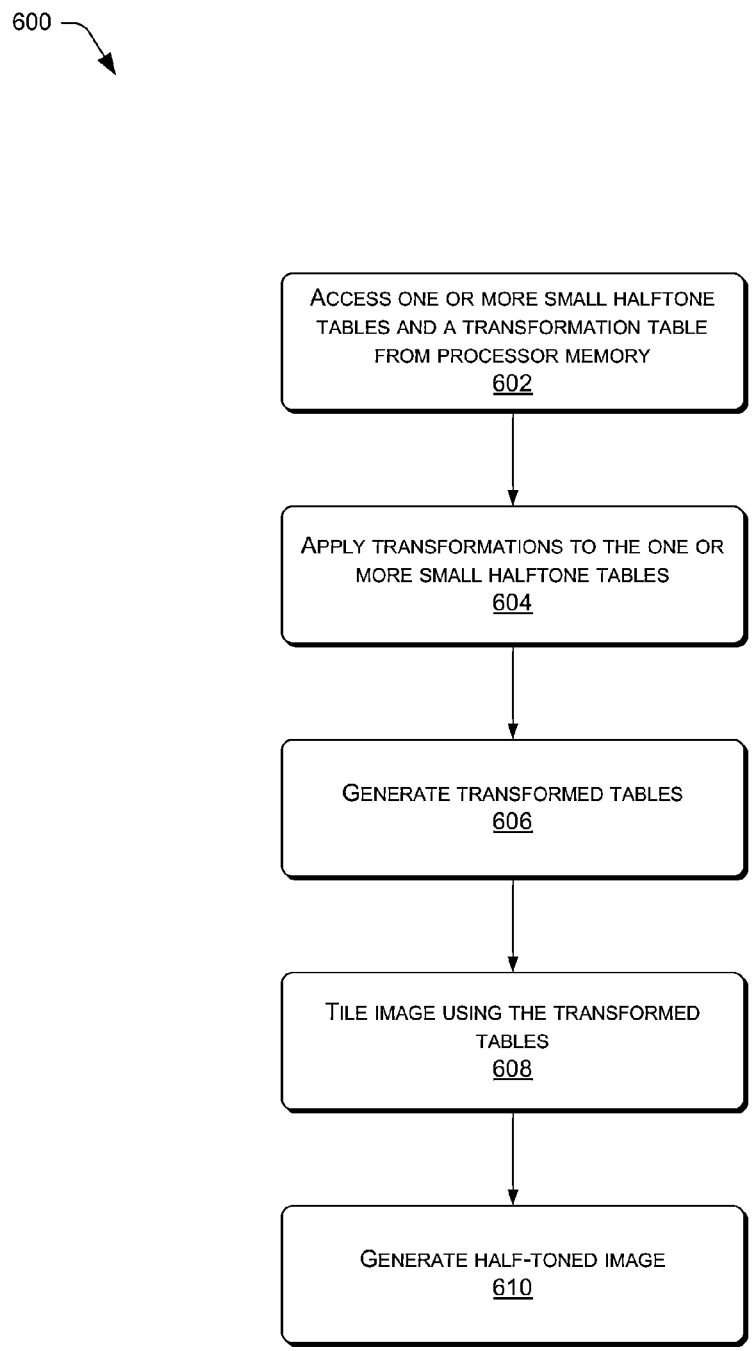
FIG. 6 is a flowchart illustrating an example halftone process.

FIG. 6 illustrates an example method 600 of a half-toning process. The method 600 begins at block 602, with accessing, from a memory of a processor in the printing device, a transformation table and at least one small threshold halftone table unsuitable for the half-toning process. The memory of the processor generally includes at least one of a tightly coupled memory, ASIC SRAM, a cache memory of the processor, or the like. Main memory 112, accessible by the processor via memory controller 122, would not be considered as a memory of the processor. However, in an embodiment, techniques described herein are also suitable for reducing memory size requirements for memory 112. The memory of the processor may contain the transformation table and one or more small threshold halftone tables. As described herein, each of the small threshold halftone tables, if used individually for tiling across contone image 208, would be unsuitable for implementing the half-tone process at least because they are small enough to create visually perceptible repeat patterns on the resultant half-toned image, such as halftone image 210. As an example, a small threshold halftone table of size 64×64 or 128×128 used to tile a high resolution image for printing at 600 DPI, 1200 DPI or higher would produce noticeable repeat patterns on a half-toned image that would be visually perceptible by a human observer under normal viewing distances and angles.

At block 604, if only one small threshold halftone table (e.g., loaded in cache 126) is used, transformations indicated in the transformation table (e.g., transformation table 204 or 404) are individually applied to the small threshold halftone table. If multiple small threshold halftone tables (e.g., loaded in cache 126) are used, transformations indicated in the transformation table are individually applied to each selected one of the multiple small threshold halftone tables. The multiple small threshold halftone tables may be selected sequentially, in a round-robin fashion, at random, in a pre-specified order or may be specified in the transformation table associated with a particular transformation to be applied to the corresponding specified small threshold halftone table. Likewise, in an aspect, values in the transformation table may be selected sequentially in a round-robin fashion, and upon reaching the end of the transformation table, values may be selected by starting over at the beginning of the transformation table, with this process repeated as part of the tiling process. In a different aspect, values may be selected randomly, or pseudo-randomly, from the transformation table. As described herein, the transformation table may have K entries and J different individual transformation values, where J K.

At block 606, transformed tables (e.g., halftone tables 206(1)-206(N) or 406(1)-406(N)) are generated by applying transformations indicated in the transformation table. At block 608, an image, such as contone image 208, is tiled with the transformed tables. In an embodiment, contone image 208 is tiled by an associated transformed table as it is generated after the corresponding transformation is applied. As transformed tables are tiled across the image, one or more blocks of transformed tables may be generated. A block of transformed tables, such as a block of size M×M or M×P transformed tables, may represent a large threshold halftone table suitable for the half-toning process at least because of its large size, as well as its spatial distribution of dots. As such, if tiling of this large threshold halftone table were to be repeated across the image, it would not create one or more visually perceptible repeat patterns on the half-toned image, making it suitable for the half tone process. To accomplish this, the effective large threshold halftone table would be much larger than the one or more small threshold halftone tables and larger than cache 126. Therefore, the memory of the processor (e.g. cache memory, tightly coupled memory, or the like) could be selected that may contain multiple small threshold halftone tables and the transformation table, yet be sized much smaller than the size of the effective large threshold halftone table.

At block 610, the transformed tables are tiled across the entire image, such that a resultant half-toned image is generated. The printing device may print the resultant half-toned image while it is being generated (e.g., during the tiling process), or after part or all of the half-toned image is generated.

Figure 7:
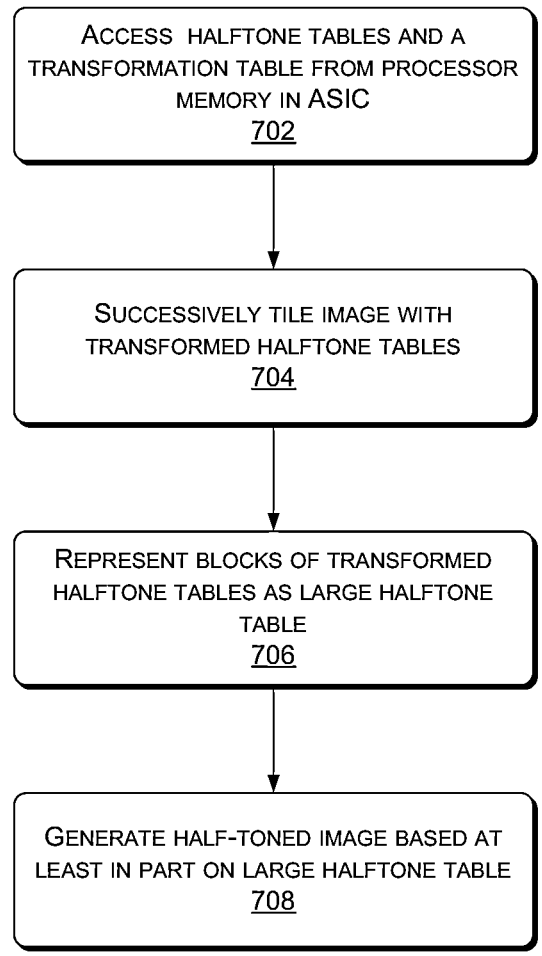
FIG. 7 is a flowchart illustrating an example halftone process.

FIG. 7 illustrates an example method 700 of a half-toning process. The method 700 begins at block 702, with accessing a transformation table and one or more small threshold halftone tables stored in a memory of a processor on an application-specific integrated circuit (ASIC), wherein the transformation table includes transformation values and each of the one or more small threshold halftone tables are unsuitable for tiling an image for generating a corresponding half-toned image suitable for printing by the printing device. As an example, the memory of the processor (e.g., cache 126) includes at least one of a tightly coupled memory or a cache memory of the processor that stores the transformation table and one or more small threshold halftone tables. In an aspect, a goal is to have the memory of the processor be as small as possible to reduce hardware costs. As such, the memory is sized small enough to store the transformation table and one or more small threshold halftone tables.

As described herein, each of the small threshold halftone tables, if used individually for tiling across a high resolution input image, would be unsuitable for implementing the halftone process because they are small enough to create visually perceptible repeat patterns on the resultant half-toned image. Thus, a human observer would notice repeat patterns while viewing the resultant half-toned image under normal viewing distances and viewing angles. In an aspect, multiple small threshold halftone tables tiled across a high resolution input image would still create visually perceptible repeat patterns on the resultant half-toned image. In order to maintain the desired small memory size, a number of multiple small threshold halftone tables would be limited to a total size that is much smaller than the size of a large threshold halftone table that, if used for tiling, would not create visually perceptible repeat patterns on the resultant half-toned image. However, the large threshold halftone table would be too large to fit in the memory of the processor. As an example, the memory of the processor may be of a size less than or equal to 8192 bytes to implement the half-toning process described herein.

At block 704, the image is successively tiled with transformed small threshold halftone tables, wherein each transformed small threshold halftone table is generated by applying one of the transform values to a selected small threshold halftone table of one or more small threshold halftone tables. Where multiple small threshold halftone tables are stored in the memory, a small threshold halftone table may be selected randomly, sequentially, in a pre-determined ordered fashion, round-robin, specified by an associated transform value, or the like. As such, for each tile of the tiling process, the selected small threshold halftone table is transformed by a transformation associated with the transform value to generate the transformed small threshold halftone table that is used for tiling. As discussed herein, the transformed tables are designed to meet boundary conditions between tiles and across sequences of tiles, such that a human observer, under normal viewing conditions, would not observe defects on the resultant half-toned image associated with boundaries between tiles.

At block 706, as transformed tables (e.g., halftone tables 206(1)-206(N) or 406(1)-406(N)) are tiled across an image, blocks of transformed tables (i.e., tiles) are created. As such, the size of a block may increase as each tile is applied. A structure of the spatial distribution of dots in various sized blocks of tiles may be controlled by a number of factors, such as, the structure of the sequence of applied transformations, the structure of the sequence of selected small tables, combinations of transformation sequences as applied to combinations of selected small table sequences, a number of transformations applied before repeating the applied transformation sequence, or the like. As blocks of tiles grow progressively larger during the tiling process, a block will be generated that effectively represents a large threshold halftone table suitable for generation of the half-toned image for printing by the printing device. As an example, the block may be represented by at least an approximation of a large stochastic mask suitable for generation of the half-toned image at least because it would not create one or more visually perceptible repeat patterns on the half-toned image. Such a block would have a size that is too large for storage in the memory of the processor that is selected to have a small size to reduce hardware and manufacturing costs. The transformation table may be constructed such that the block (e.g., approximation of the large stochastic mask) may repeat such that the transformation values may simply repeat since the block represents a significantly large enough halftone table so that repeat patterns are not discernible. However, the transformation table may contain transformation values, along with an availability of multiple small halftone tables for selection, such that a different sufficiently large block (e.g., large threshold halftone table) may be generated next as a continuation of the tiling process. Thus, multiple large threshold halftone tables may be effectively represented during the tiling process. The multiple large threshold halftone tables may be effectively represented during the tiling process in different sequences, and may be of different shapes and sizes relative to each other. Random selection of threshold values and/or multiple small threshold halftone tables may result in a random generation of multiple large threshold halftone tables during the tiling process. As an example, an approximation of one or more 1024×1024 sized stochastic masks may be generated as part of the tiling process.

At block 708, the half-toned image suitable for printing by the printing device is generated based at least in part on the tiling and the one or more large threshold halftone tables. Even though the image is tiled by transformations of the unsuitable small tables, the image is also effectively tiled by one or more suitable large threshold halftone tables to generate a suitable half-toned image absent at least one or more visually perceptible repeat patterns on the half-toned image, as well as other discernible distortion patterns as described herein.

CONCLUSION

Note that the description above incorporates use of the phrases "in an aspect," "in an embodiment," or "in various embodiments," or the like, which may each refer to one or more of the same or different embodiments. Furthermore, the terms "comprising," "including," "having," and the like, as used with respect to embodiments of the present disclosure, are synonymous.

As used herein, the terms "logic," "component," and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although the present disclosure describes embodiments having specific structural features and/or methodological acts, it is to be understood that the claims are not necessarily limited to the specific features or acts described. Rather, the specific features and acts are merely illustrative some embodiments that fall within the scope of the claims of the present disclosure.

What is claimed is:

1. A method of implementing a half-toning process in a printing device, the method comprising:
    accessing, from a memory of a processor in the printing device, (i) a transformation table, and (ii) a first threshold halftone table unsuitable for the half-toning process;
    applying transformations indicated in the transformation table to the first threshold halftone table;
    based upon applying transformations, generating transformed tables, wherein the transformed tables comprise transformations of the first threshold halftone table;
    tiling an image with the transformed tables, wherein a block of the transformed tables represents a second threshold halftone table suitable for the half-toning process, wherein the second threshold halftone table is larger than the first threshold halftone table; and
    based at least in part on the second threshold halftone table, generating a half-toned image of the image.

2. The method of claim 1, wherein:
    the memory of the processor comprises (i) a tightly coupled memory, (ii) a cache memory of the processor, or (iii) a local Static Random Access Memory (SRAM) of an Application-Specific Integrated Circuit (ASIC);
    the memory is large enough to contain each of (i) the first threshold halftone table and (ii) the transformation table; and
    the memory is not large enough to contain the block of the transformed tables.

3. The method of claim 1, wherein tiling the image with the first threshold halftone table creates one or more visually perceptible repeat patterns on the half-toned image based at least in part on a small size of the first threshold halftone table.

4. The method of claim 1, wherein tiling the image with the transformed tables does not create one or more visually perceptible repeat patterns on the half-toned image based at least in part on a large size of the second threshold halftone table.

5. The method of claim 1, wherein tiling the image is performed during the applying transformations.

6. The method of claim 1, wherein the transformation table contains a number of transformation values, wherein each transformation value indicates at least a specific transformation to use for the applying transformations.

7. The method of claim 6, wherein:
    the number of transformation values equals a number of entries in the first threshold halftone table; or
    the number of transformation values is less than a number of entries in the first threshold halftone table.

8. The method of claim 6, wherein:
    the applying transformations are performed on a third threshold halftone table unsuitable for the half-toning process;
    the transformed tables further comprise transformations of the third threshold halftone table; and
    each transformation value further indicates a specific one of the first or the third threshold halftone tables to use for the applying transformations.

9. The method of claim 1, wherein:
    the first threshold halftone table is of size N×N;
    the transformation table is of size K×K or K×L; and
    the second threshold halftone table is of size M×M or M×P, where M>>N, P>>N, M>>K, P>>K, M>>L and P>>L, with M, N, K, P and L being positive integers.

10. The method of claim 1, wherein:
    the transformation table contains K+1 entries of I unique transformation values; and
    the K+1 entries include various sequences of the I unique transformation values, where K+1>I, with K and I being positive integers.

11. The method of claim 1, wherein:
    the applying transformations are performed on a third threshold halftone table unsuitable for the half-toning process;
    the transformed tables further comprise transformations of the third threshold halftone table; and
    the first and the third threshold halftone tables are selected randomly for the applying transformations.

12. The method of claim 11, wherein the first and the third threshold halftone tables are indicated in the transformation table.

13. The method of claim 1, wherein:
    the transformation table includes transformation values selected randomly; and
    each transformation value indicates a particular transformation used for the applying transformations.

14. The method of claim 1, further comprising printing the half-toned image by the printing device during the tiling.

15. A printing device comprising an application-specific integrated circuit (ASIC) including a processor that includes a memory, wherein the ASIC is configured to:
    store (i) a transformation table and (ii) a first threshold halftone table in the memory, wherein the first threshold halftone table is unsuitable for tiling an image to be processed to generate a half-toned image suitable for printing by the printing device;
    access the transformation table from the memory, the transformation table including transformation values;
    successively tile the image with transformed halftone tables, wherein each transformed halftone table is generated by applying the transformation values to the first threshold halftone table; and
    generate the half-toned image suitable for printing by the printing device based at least in part on one or more blocks of the transformed tables representing a second threshold halftone table suitable for generation of the half-toned image, wherein the second threshold halftone table has a size that is too large for storage in the memory.

16. The printing device of claim 15, wherein the memory of the processor includes at least one of (i) a tightly coupled memory, (ii) a cache memory, or (iii) a local Static Random Access Memory (SRAM) of the ASIC.

17. The printing device of claim 15, wherein:
the first threshold halftone table is unsuitable for tiling at least because one or more visually perceptible repeat patterns would be created on the half-toned image; and
the second threshold halftone table would not create one or more visually perceptible repeat patterns on the half-toned image.

18. A method of implementing a half-toning process in a printing device, the method comprising:
accessing at least a portion of a transformation table and at least a portion of a first threshold halftone table stored in a memory of a processor on an application-specific integrated circuit (ASIC), wherein the transformation table includes transformation values, and wherein the first threshold halftone table is unsuitable for tiling an image for generating a corresponding half-toned image suitable for printing by the printing device;
successively tiling the image with transformed threshold halftone tables, wherein each transformed threshold halftone table is generated by applying the transformation values to the first threshold halftone table;
representing one or more blocks of the transformed threshold halftone tables as a second threshold halftone table suitable for generation of the half-toned image for printing by the printing device, and wherein each of the one or more blocks has a size that is too large for storage in the memory; and
based at least in part on the tiling and the second threshold halftone table, generating the half-toned image suitable for printing by the printing device.

19. The method of claim 18, wherein the memory of the processor includes at least one of (i) a tightly coupled memory, (ii) a cache memory, or (iii) a local Static Random Access Memory (SRAM) of the ASIC.

20. The method of claim 18, wherein:
the first threshold halftone table is unsuitable for tiling at least because one or more visually perceptible repeat patterns would be created on the half-toned image; and
the second threshold halftone table is suitable for generation of the half-toned image at least because the second threshold halftone table would not create one or more visually perceptible repeat patterns on the half-toned image.

* * * * *